(12) United States Patent
Sung et al.

(10) Patent No.: US 7,079,171 B2
(45) Date of Patent: Jul. 18, 2006

(54) COLOR LASER PRINTER

(75) Inventors: Bu-hyun Sung, Gyeonggi-do (KR);
Chul-woo Lee, Gyeonggi-do (KR);
Soon-kyo Hong, Seoul (KR);
Young-woo Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/423,988

(22) Filed: Apr. 28, 2003

(65) Prior Publication Data
US 2003/0210324 A1 Nov. 13, 2003

(30) Foreign Application Priority Data
May 10, 2002 (KR) .................... 10-2002-0025907

(51) Int. Cl.
*B41J 2/447* (2006.01)
*B41J 2/455* (2006.01)

(52) U.S. Cl. ..................................... 347/241
(58) Field of Classification Search ............... 347/241, 347/243, 259–261, 256, 258
See application file for complete search history.

(56) References Cited

U.S. PATENT DOCUMENTS 4,760,407 A 7/1988 Arimoto et al.

(Continued)

FOREIGN PATENT DOCUMENTS

| JP | 63-041821 | 2/1988 | | |
|---|---|---|---|---|
| JP | 2-29614 | * 1/1990 | ................. | 347/241 |
| JP | 06-286226 | 10/1994 | | |
| JP | 08-228046 | 9/1996 | | |
| JP | 2000-043333 | 2/2000 | | |
| JP | 2000-275556 | 10/2000 | | |

OTHER PUBLICATIONS

Chinese Office Action dated Jul. 1, 2005 issued in corresponding Chinese Patent Application No. 03108195.9.
Office Action issued in Japanese Patent Application No. 2003-044633 on Nov. 29, 2005.

*Primary Examiner*—Huan Tran
(74) *Attorney, Agent, or Firm*—Stein, McEwen & Bui, LLP

(57) ABSTRACT

A color laser printer producing a color image using a single laser scanning unit includes a lighting unit including first and second laser diodes emitting beams of one polarization, a polarization prism transmitting or reflecting incident beams depending on a direction of polarization, and third and fourth laser diodes disposed in a different direction from the first and second laser diodes with respect to the polarization prism, a rotary polygon mirror that reflects the beam emitted along the same path from the lighting unit, an f-θ lens that focuses the beam reflected by the rotary polygon mirror, first and second polarization beam splitters, each of which transmits or reflects the beam passing through the f-θ lens depending on the direction of the polarization, and first through fourth photoconductive units on which the beams reflected and transmitted through the first and second polarization beam splitters are incident. In the color laser printer, lengths of optical paths between the f-θ lens and each of the first through fourth photoconductive units are equal. The color laser printer is constructed such that a plurality of light sources emitting the beams of one polarization are arranged separately and the beams emitted from the light sources are combined by the polarization prism to enter the f-θ lens, thereby reducing a thickness of the f-θ lens.

49 Claims, 7 Drawing Sheets

U.S. PATENT DOCUMENTS

| | | |
|---|---|---|
| 4,962,312 A | 10/1990 | Matuura et al. |
| 5,563,647 A * | 10/1996 | Fisli .......................... 347/232 |
| 5,638,393 A | 6/1997 | Kovacs |
| 5,691,761 A * | 11/1997 | Fisli .......................... 347/241 |
| 5,784,094 A | 7/1998 | Ota et al. |
| 5,956,070 A * | 9/1999 | Paoli et al. .................. 347/241 |
| 6,061,079 A | 5/2000 | Ota et al. |
| 6,836,278 B1 * | 12/2004 | Saito et al. .................. 347/233 |

* cited by examiner

COLOR LASER PRINTER

CROSS-REFERENCE TO RELATED APPLICATIONS

This application claims the benefit of Korean Patent Application No. 2002-25907, filed May 10, 2002, in the Korean Intellectual Property Office, the disclosure of which is incorporated herein by reference.

BACKGROUND OF THE INVENTION

1. Field of the Invention

The present invention relates to a color laser printer, and more particularly, to a color laser printer which produces a color image using a single laser scanning unit.

2. Description of the Related Art

Monochrome laser printers use a single laser scanning unit (LSU) and a single organic photoconductive cell (OPC) drum since they transfer only black ink onto a sheet of paper. In contrast, color laser printers need four LSUs and four OPC drums to transfer four ink colors, such as black (B), magenta (M), yellow (Y), and cyan (C), onto the sheet. As shown in FIG. 1A, a color laser printer includes a toner container 104, OPC drums 100-K, 100-C, 100-M, and 100-Y for black, cyan, magenta, and yellow, respectively, LSUs 102-K, 102-C, 102-M, and 102-Y forming electrostatic latent images by scanning laser beams over the OPC drums 100-K, 100-C, 100-M, and 100-Y electrically charged to a predetermined potential, developing units 105-K, 105-C, 105-M, and 105-Y developing the electrostatic latent images with four color developing solutions, a transfer belt 108 receiving developed images developed on the OPC drums 100-K, 100-C, 100-M, and 100-Y, a transfer unit 110 transferring a four color image formed of the developed images superimposed on the transfer belt 108 onto a paper sheet P, and a fixing unit 115 fixing the transferred image on the paper sheet P by applying heat and pressure to the paper sheet P.

As described above, to produce the color image, the conventional color laser printer uses the OPC drums 100-K, 100-C, 100-M, and 100-Y for black, cyan, magenta, and yellow, respectively, and the four LSUs 102-K, 102-C, 102-M, and 102-Y corresponding to the four colors.

Each LSU 102-K, 102-C, 102-M, or 102-Y scans a laser beam over a photoconductive medium, such as the corresponding OPC drum 100-K, 100-C, 100-M, or 100-Y to form an electrostatic latent image. Referring to FIG. 1B, a typical LSU includes a light source 107 emitting the laser beam, a rotary polygon mirror 109 driven by a motor (not shown) and reflecting the laser beam emitted from the light source 107, an f-θ lens 115 focusing the laser beam reflected by the rotating polygon mirror 109 on a surface of a photoconductive drum 110, e.g., one of the OPC drums 100-K, 100-C, 100-M, and 100-Y, to form a spot of an appropriate diameter along a scanning line 118, and a reflector 120 disposed on an optical path between the f-θ lens 115 and the photoconductive drum 110 to reflect an incident beam so that the laser beam passing through the f-θ lens 115 is directed toward the photoconductive drum 110. A predetermined electrostatic latent image is formed on the photoconductive drum 110 by controlling an on/off state of the light source 107.

Furthermore, a collimating lens 122 converting the laser beam into a parallel beam to an axis of the collimating lens 122, and a cylindrical lens 135 converging the parallel beam to a reflective surface of the rotary polygon mirror 109 are disposed along the optical path between the light source 107 and the rotary polygon mirror 109. A sensor 125 is disposed to detect a position where the scanning line 118 starts.

Here, the laser beam emitted from the light source 107 is converted into the parallel beam by the collimating lens 122, and the parallel beam passes through the cylindrical lens 135 and is reflected by the rotary polygon mirror 109. The beam reflected off from the rotary polygon mirror 109 passes through the f-θ lens 115, and the reflector 120 changes the optical path of the beam so that the beam is focused on the photoconductive drum 110 to form the spot at a point along the scanning line 118 of the photoconductive drum 110.

The color laser printer configured as described above has not yet become popular due to high manufacturing costs. A manufacturing cost of the LSUs is a largest percentage of a total cost of the color laser printer. Therefore, one way to reduce the cost of the color laser printer is to minimize the number of the LSUs used therein.

Another problem with this type of color laser printer is that a jitter and a periodic oscillation occur when a spindle motor drives the rotary polygon mirror for each color, and vary according to each LSU. This causes four different color lines to be printed along different scanning lines when a user desires a single line to be printed on a paper sheet, thus lowering a printing quality. To solve these problems, conventional color laser printers require an electrical, mechanical, or optical adjustment for the jitter and the periodic oscillation. However, this process increases the manufacturing costs.

Most recently, in order to reduce the manufacturing costs, research on minimizing the number of the LSUs has been conducted. An example of conventional color laser printers having a single LSU is disclosed in Japanese Laid Open Patent Application No. 2000-43333A. Referring to FIG. 2, this conventional color laser printer consists of a spindle motor 142, a rotating polygon mirror 143, and first through fourth laser diodes 140a–140d arranged in parallel so that a beam emitted from each of the diodes 140a–140d strikes the rotating polygon mirror 143 at a different incidence angle.

In the color laser printer configured as described above, four beams are reflected through the rotating polygon mirror 143 at different angles, which requires an f-θ lens 145 of a large thickness. However, as is well known, f-θ lenses of the large thickness are more difficult to manufacture.

Furthermore, the beams reflected off from the rotating polygon mirror 143 have different focal distances with respect to reflectors 144a–144d, through which each beam is respectively reflected, and with respect to first through fourth photoconductive drums 147a–147d on which each beam is respectively focused. Due to their different focal distances, a spot for each color is formed at a different position on each of the photoconductive drums 147a–147d, and therefore, first through fourth correcting lens 146a–146d are separately provided to prevent the different focal distances, which cause image differences, and to make the image differences equal or corrected. Overall, this construction increases the manufacturing and assembly costs. Further, compared with the color laser printer using the four LSUs, this color laser printer has a limited advantage in terms of optical characteristics.

Another example of conventional color laser printers is disclosed in U.S. Pat. No. 6,061,079. Referring to FIG. 3A, this color laser printer has a similar configuration in some respects with the Japanese Laid Open Patent Application No. 2000-43333A described above. That is, the color laser printer includes a spindle motor 152, a rotating polygon mirror 153, and first through fourth laser diodes 150a–150d arranged in parallel (i.e., sequentially in a longitudinal direction) so that a beam emitted from each of the diodes 150a–150d is incident upon the rotating polygon mirror 153 at a different angle.

In the color laser printer shown in FIG. 3A, a distance between an f-θ lens 155, through which four light beams reflected by the rotating polygon mirror 153 pass, and each of first through fourth photoconductive drums 160a–160d for different colors on which the beams are focused, is equal. As shown in FIG. 3B, each of first through fourth light beams I, II, III and IV, reflected by the f-θ lens 155 along different paths, is reflected through a prism-type reflector 156 and focused near each of the photoconductive drums 160a–160d corresponding to each color through each of cylindrical lenses 158a–158d.

However, one drawback of the color laser printer configured as described above is that a thickness of the f-θ lens 155 becomes large since each of the four light beams I, II, III and IV passes through the f-θ lens 155 at different vertical positions. As described above, this makes it difficult to manufacture the f-θ lens 155, thereby increasing the manufacturing costs. Another drawback arises from the fact that separate cylindrical lenses 158a, 158b, 158c, and 158d are used to focus the four light beams near the photoconductive drums. Since the four cylindrical lenses 158a, 158b, 158c, and 158d cause different amounts of aberration and lead to an assembly error when combined together. As a result, despite the use of only one LSU, a single line command results in four color lines printed along different scanning lines, thus lowering the printing quality.

SUMMARY OF THE INVENTION

To solve the above and/or other problems, it is an aspect of the present invention to provide a color laser printer using an f-θ lens of a reduced thickness, disposing a plurality of light sources separately, and passing light signals through the f-θ lens after beams emitted from the light sources are combined through a polarization prism, thereby making equal the lengths of optical paths between the f-θ lens and a photoconductive unit for each color by using a plurality of optical path changing units.

Additional aspects and advantages of the invention will be set forth in part in the description which follows and, in part, will be obvious from the description, or may be learned by practice of the invention.

According to an aspect of the present invention, a color laser printer producing a color image using a single laser scanning unit includes a lighting unit including first and second laser diodes emitting first beams having a first polarization, third and fourth laser diodes disposed in a different direction from the first and second laser diodes to emit second beams having a second polarization, and a polarization prism transmitting or reflecting the first and second beams depending on a direction of polarization to transmit the first and second beams along the same path, a rotary polygon mirror that reflects the first and second beams transmitted along the same path from the lighting unit, an f-θ lens that focuses the first and second beams reflected by the rotary polygon mirror, first and second polarization beam splitters, each of which transmits or reflects the first and second beams passing through the f-θ lens depending on the direction of the polarization, and first through fourth photoconductive units on which the first and second beams reflected and transmitted through the first and second polarization beam splitters are incident. In the color laser printer, lengths of optical paths between the f-θ lens and respective ones of the first through fourth photoconductive units are equal.

The color laser printer further includes an optical path changing unit disposed on the optical paths along which the first and second beams transmitted through the first and second polarization beam splitters respectively travel.

According to another aspect to the present invention, a color laser printer producing a color image using a single laser scanning unit includes a lighting unit including first and second laser diodes emitting first beams having a first polarization, third and fourth laser diodes disposed in a different direction from the first and second laser diodes to emit second beams having a second polarization, and a polarization prism transmitting or reflecting the first and second beams depending on a direction of polarization to output the first and second beams along a common path, a rotary polygon mirror that reflects the first and second beams outputted along the common path from the lighting unit, an f-θ lens that focuses the first and second beams reflected by the rotary polygon mirror, a first optical path changing unit that divides the common path of the first and second beams passing through the f-θ lens into two different paths of the first and second beams traveling, first and second polarization beam splitters, each of which transmits or reflects the first and second beams divided by the first optical path changing unit depending on the direction of the polarization, and first through fourth photoconductive units on which the first and second beams reflected and transmitted through the first and second polarization beam splitters are incident. In the color laser printer, lengths of optical paths formed between the f-θ lens and respective ones of the first through fourth photoconductive units equal.

Furthermore, the color laser printer includes second and third optical path changing units disposed on corresponding ones of the optical paths along which the first beams reflected through the first and second polarization beam splitters respectively travel.

The color laser printer further includes transmission-type plate glasses disposed between the first polarization beam splitter and the second optical path changing unit and between the second polarization beam splitter and the third optical path changing unit.

The color laser printer further includes fourth and fifth optical path changing units disposed on the optical paths along which the second beams transmitted through the first and second polarization beam splitters respectively travel.

According to another aspect to the present invention, a method in a color laser printer producing a color image using a single laser scanning unit includes generating a first beam having a first polarization, a second beam having a second polarization to output the first and second beams along a common optical axis, transmitting one of the first and second beams to generate a first path beam along a first optical path, reflecting the other one of the first and second beams to generate a second path beam along a second optical path according to a direction of the first and second polarizations, transmitting the one of the first and second beams to generate a third path beam along a third optical path, reflecting the other one of the first and second beams to generate a fourth path beam along a fourth optical path according to the direction of the first and second polarizations, and causing a plurality of photoconductive units to be disposed on the first, second, third, and fourth optical paths along which the first, second, third, and fourth path beams reflected or transmitted by the first and second polarization beam splitters are incident to corresponding ones of the photoconductive units.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1A:
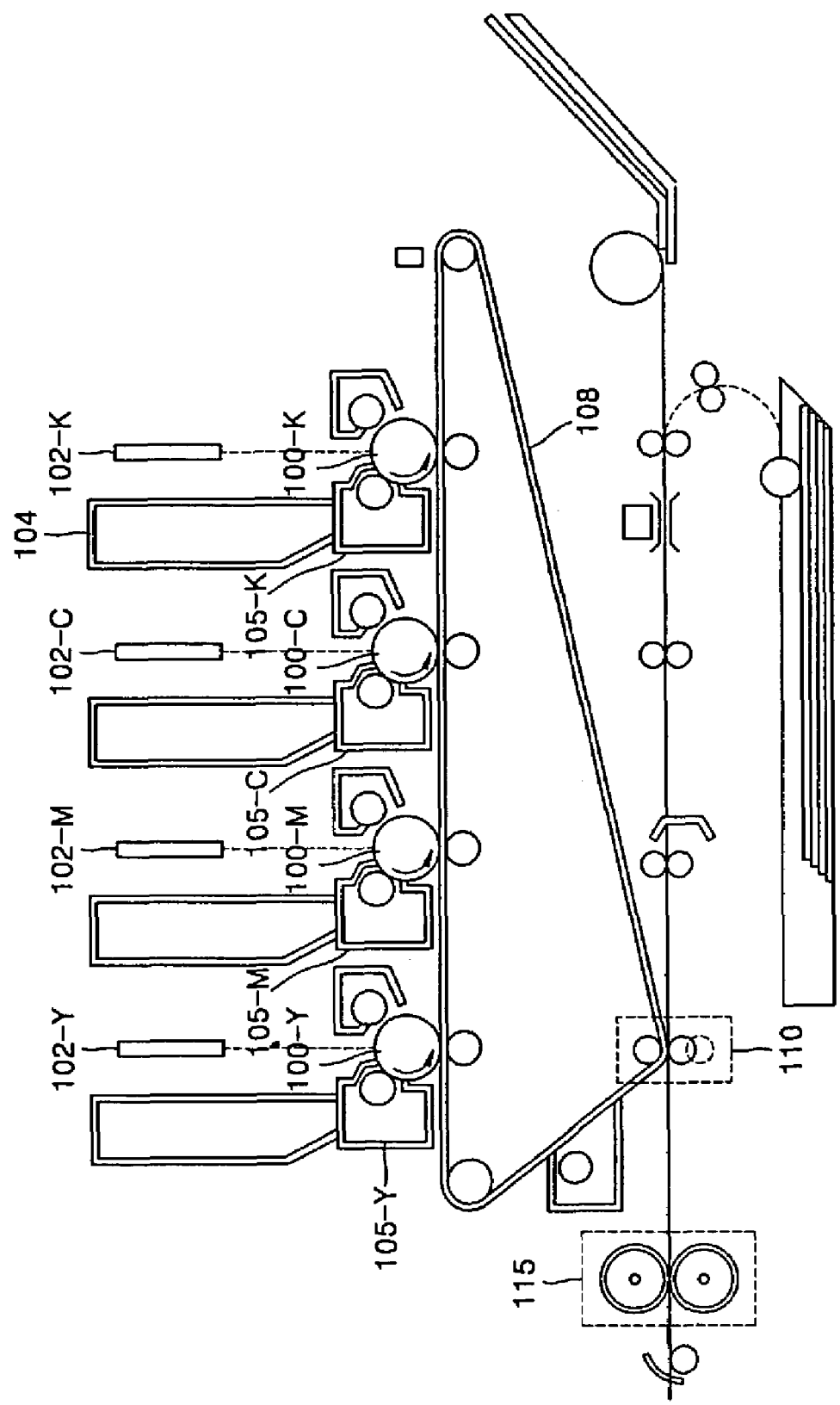
FIG. 1A shows a conventional color laser printer having four laser scanning units (LSUs)
Figure 1B:
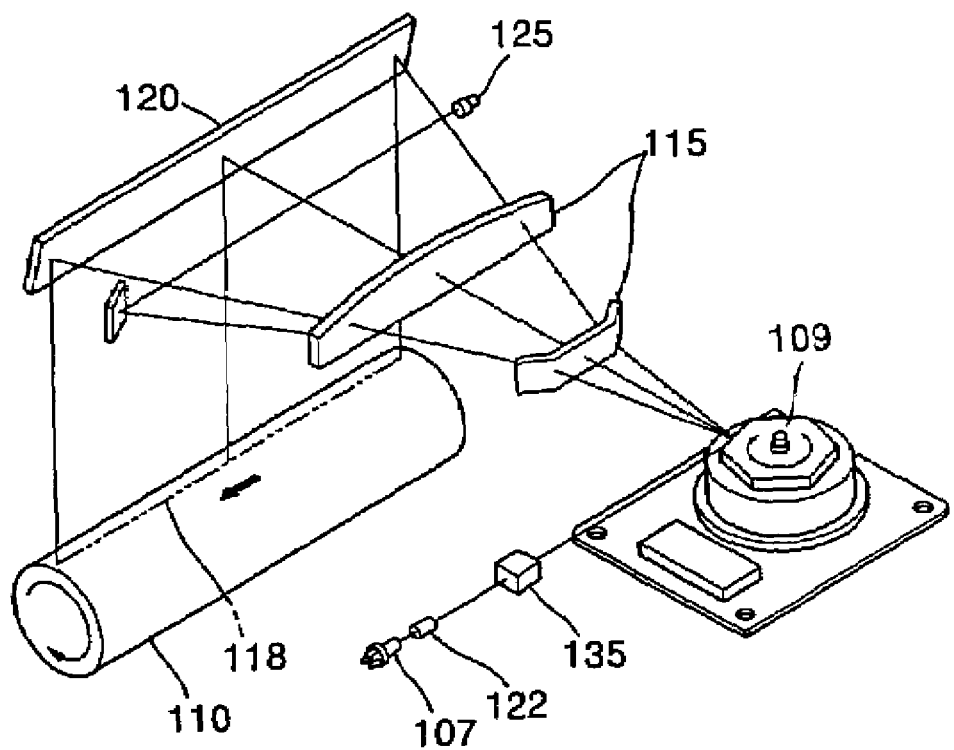
FIG. 1B shows a configuration of a conventional LSU used in the color laser printer shown in FIG. 1A.
Figure 2:
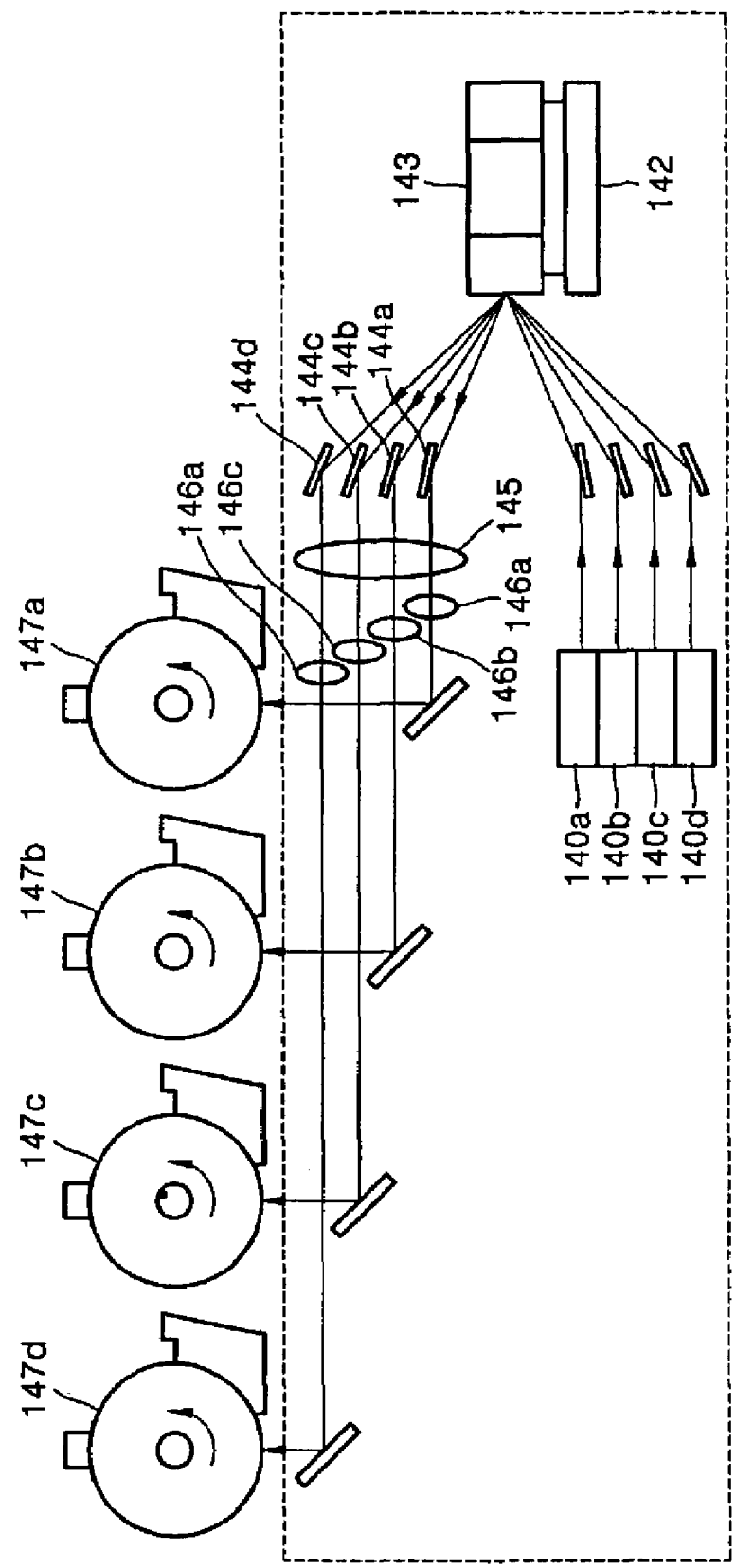
FIG. 2 shows another conventional color laser printer.
Figure 3A:
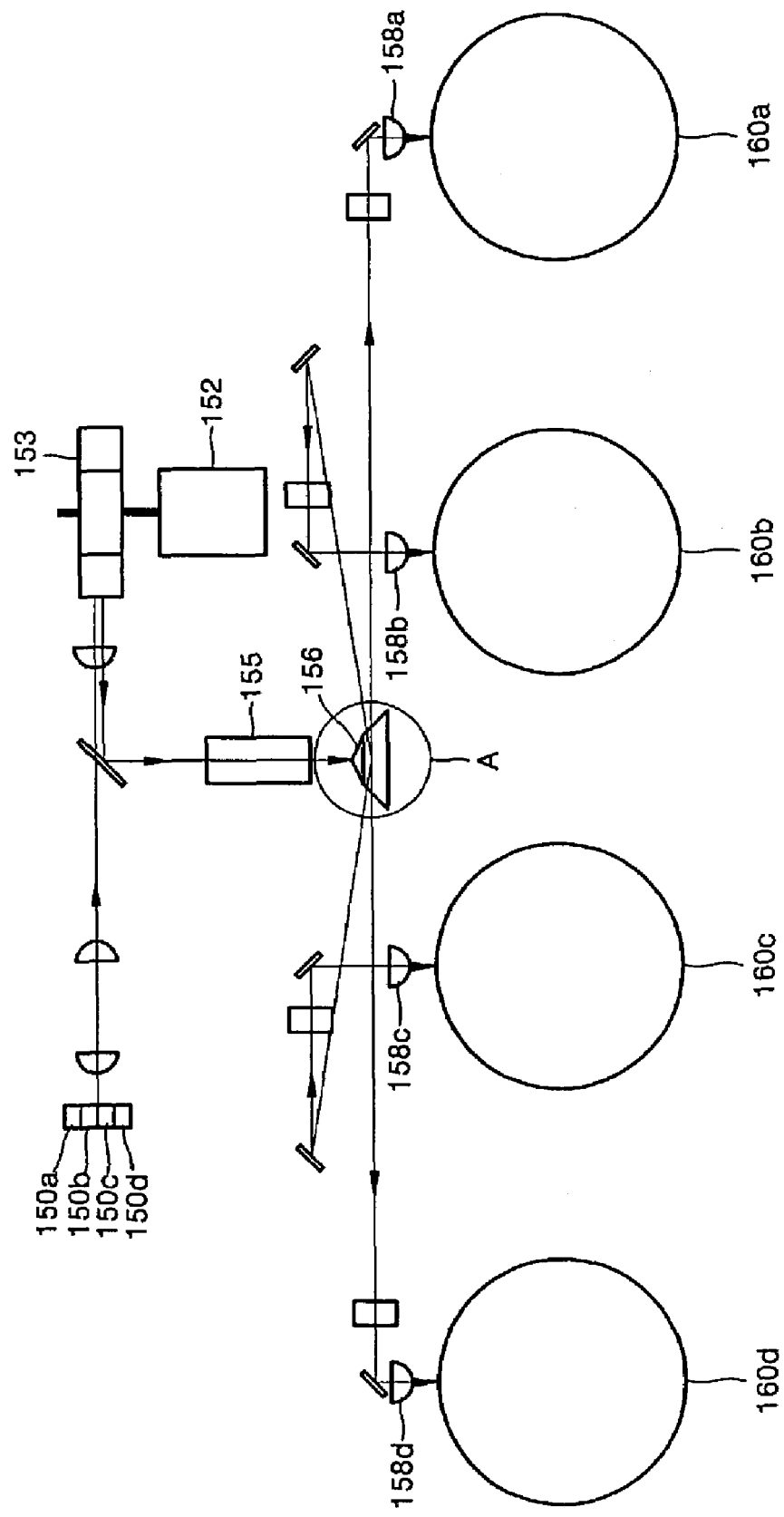
FIG. 3A shows another conventional color laser printer.
Figure 3B:
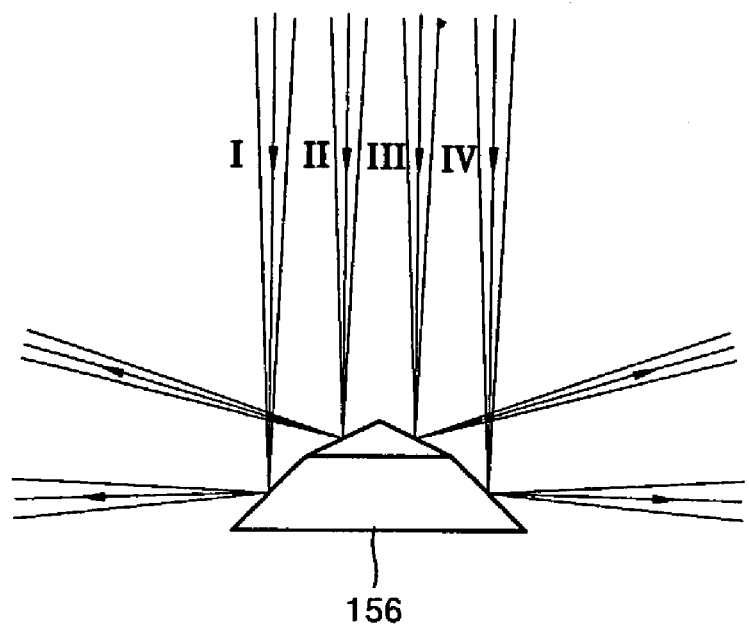
FIG. 3B is an enlarged view of a portion "A" of the color laser printer shown in FIG. 3A.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 4:
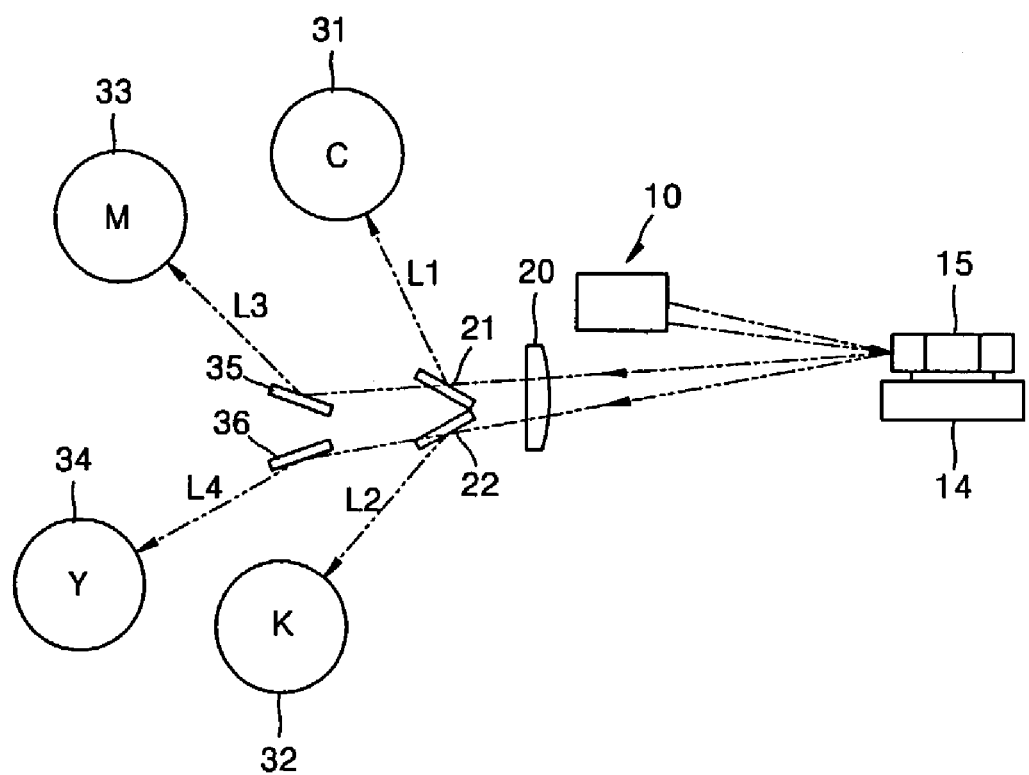
FIG. 4 shows a configuration of a color laser printer according to an embodiment of the present invention.

Referring to FIG. 4, a color laser printer according to an embodiment includes a lighting unit 10 having a plurality of light sources emitting S-polarized and P-polarized beams, a rotary polygon mirror 15 reflecting the S- and P-polarized beams emitted from the lighting unit 10, an f-θ lens 20 focusing the S- and P-polarized beams reflected by the rotary polygon mirror 15, and first and second polarization beam splitters 21 and 22 transmitting or reflecting the S- and P-polarized beams passing through the f-θ lens 20 depending on a direction of polarization of the S- and P-polarized beams.

Figure 5:
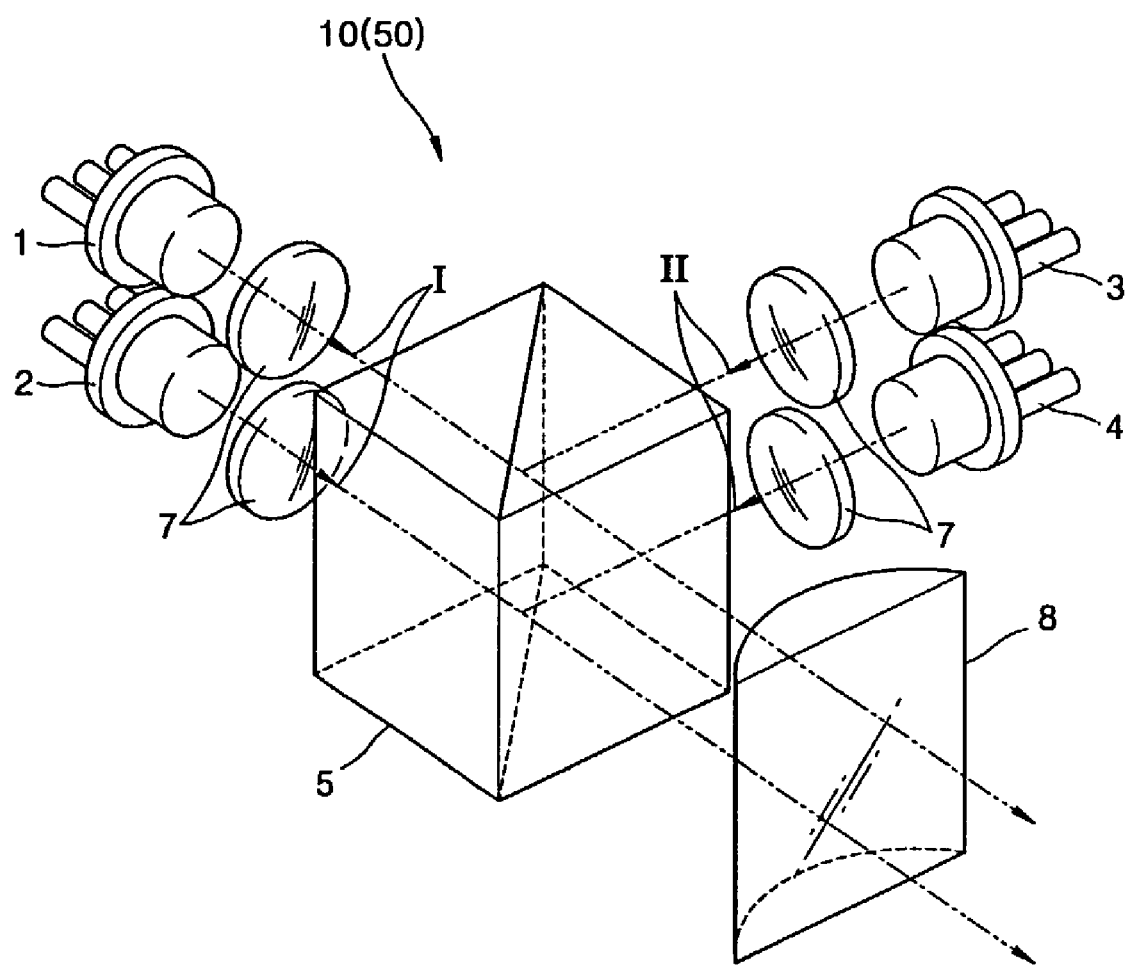
FIG. 5 shows a lighting unit adopted in the color laser printer shown in FIG. 4.

As shown in FIG. 5, the lighting unit 10 includes first and second laser diodes 1 and 2 emitting P-polarized beams, third and fourth laser diodes 3 and 4 disposed separately and in a different direction from the first and second laser diodes 1 and 2 to emit S-polarized beams, and a polarization prism 5 positioned at an intersection between optical paths of the first and second laser diodes 1 and 2 and the third and fourth laser diodes 3 and 4 to transmit or reflect incident beams, e.g., the S- and P-polarized beams, depending on the direction of polarization.

For example, the first laser diode 1 may be disposed above the second laser diode 2, both of which emit the P-polarized beams. The third laser diode 3 may be disposed above the fourth laser diode 4, both of which emit the S-polarized beams.

First and second beams I and II emitted along different optical paths from the first and second laser diodes 1 and 2 and the third and fourth laser diodes 3 and 4, respectively, are directed through the polarization prism 5 along the same optical path toward the rotary polygon mirror 15. A collimating lens 7 may be provided in every optical path between the polarization prism 5 and each of the first through fourth laser diodes 1, 2, 3, and 4 to convert each beam, e.g., the S- or P-polarized beam, emitted from each of the laser diodes 1, 2, 3, and 4 into a parallel beam. Furthermore, a cylindrical lens 8 may be provided to focus the parallel beam passing through the polarization prism 5 onto the rotary polygon mirror 15.

The P- and S-polarized beams emitted from the lighting unit 10 are reflected by the rotary polygon mirror 15 and pass through the f-θ lens 20. As a spindle motor 14 rotates the rotary polygon mirror 15, reflective surfaces of the rotary polygon mirror 15 continuously rotate so that a position where the beam is reflected is moved gradually to produce a scanning line. The S-polarized or P-polarized beam focused through the f-θ lens 20 enters the first and second polarization beam splitter 21 and 22.

The first and second polarization beam splitters 21 and 22 have the same characteristics in that they reflect one of the S-polarized and P-polarized beams and transmits the other beam. For example, the first and second polarization beam splitters 21 and 22 may be designed to reflect the S-polarized beam and transmit the P-polarized beam. Conversely, they may also be designed to reflect the P-polarized beam and transmit the S-polarized beam.

It is possible to dispose the first and second polarization beam splitters 21 and 22 in the color laser printer so that the beam reflected through either one of the polarization beam splitters 21 and 22 may travel along different optical paths. For example, the first and second polarization beam splitters 21 and 22 may be of a plate type and disposed in a V shape. In contrast, cube-type polarization beam splitters may be adopted to dispose their mirror surfaces formed in a V-shape in the color laser printer.

The beams reflected by the first and second polarization beam splitters 21 and 22 are incident on photoconductive units, such as first and second photoconductive drums 31 and 32, respectively. Furthermore, the beams transmitted through the first and second polarization beam splitters 21 and 22 are incident on third and fourth photoconductive drums 33 and 34, respectively. Here, if the optical paths from the f-θ lens 20 to the first through fourth photoconductive drums 31, 32, 33, and 34 are denoted as first, second, third, and fourth optical paths L1, L2, L3, and L4, respectively, it is possible to arrange the first through fourth photoconductive drums 31, 32, 33, and 34 such that the first through fourth optical paths L1, L2, L3, and L4 have an equal length (L1=L2=L3=L4).

Furthermore, first and second optical path changing units 35 and 36 may be provided between the first polarization beam splitter 21 and the third photoconductive drum 33 and between the second polarization beam splitter 22 and the fourth photoconductive drum 34, respectively. The first and second optical path changing units 35 and 35 may be used to make the lengths of the third and fourth optical paths L3 and L4 equal to that of the first and second optical paths L1 and L2. That is, positions of the first and second optical path changing units 35 and 36 are changed to make the lengths of the first through fourth optical paths L1–L4 equal. Here, the optical path changing units 35 and 36 may be a reflector or a polarization beam splitter.

Figure 6:
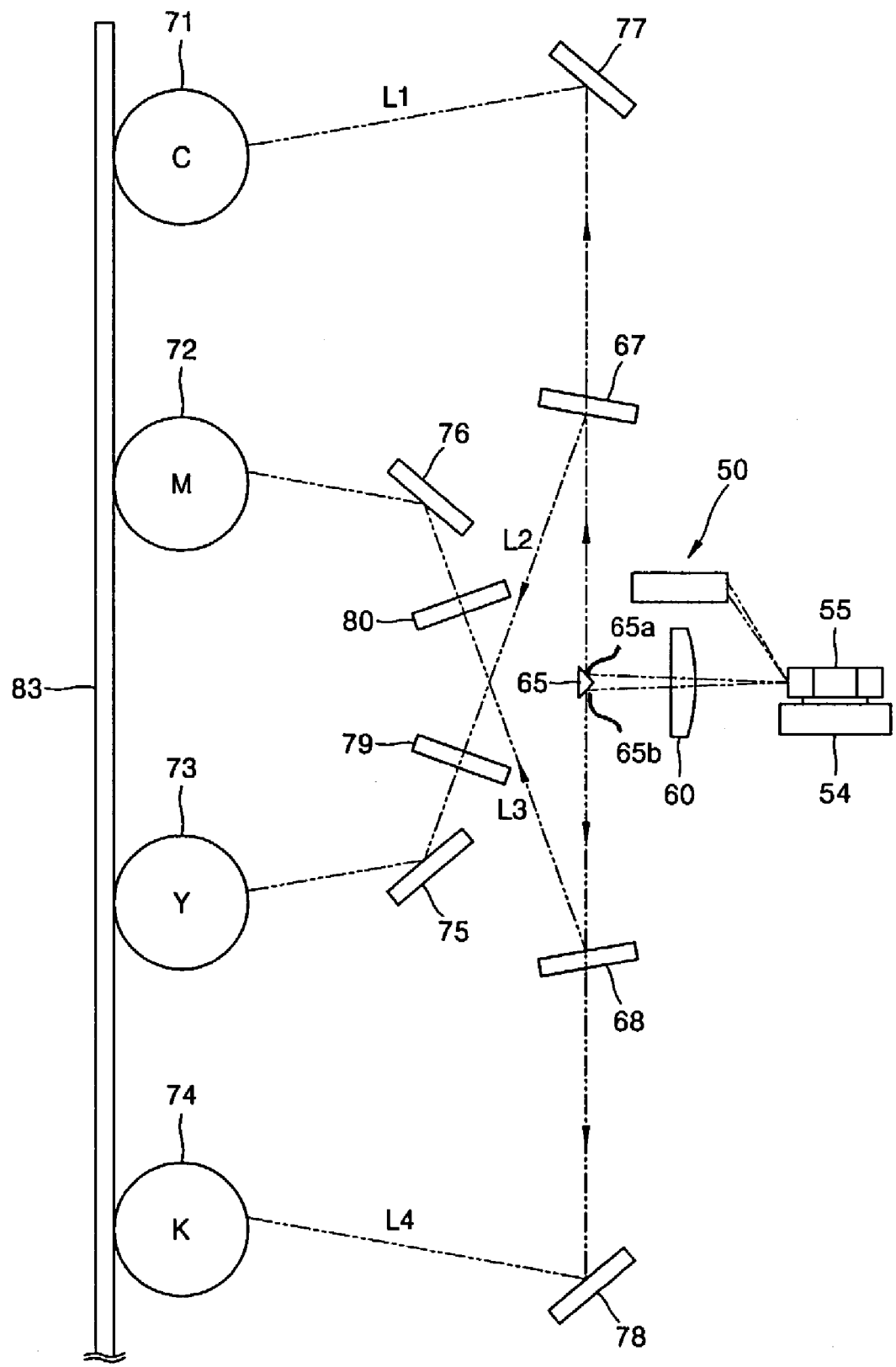
FIG. 6 shows a configuration of another color laser printer according to another embodiment of the present invention.

Another color laser printer according to another embodiment of the present invention will now be described with reference to FIG. 6. The color laser printer includes a lighting unit 50 having a plurality of light sources emitting S- and P-polarized beams, a rotary polygon mirror 55 reflecting the S- and P-polarized beams emitted from the lighting unit 50, an f-θ lens 60 focusing the S- and P-polarized beams reflected by the rotary polygon mirror 55, and a plurality of optical path changing units 65, 75, 76, 77, 78 reflecting the S- and P-polarized beams passing through the f-θ lens 60 in different directions.

The lighting unit 50 has the same configuration as the light unit 10 shown in FIG. 5. That is, the lighting unit 50 includes the first and second laser diodes 1 and 2 emitting one of the S- and P-polarized beams in one direction, the third and fourth laser diodes 3 and 4 disposed separately from the first and second laser diodes 1 and 2 to emit the other one of the S- and P-polarized beams polarized at a different angle from the one polarized beam, and the polarization prism 5 transmitting or reflecting the S- and P-polarized beams emitted from the first through fourth light sources 1, 2, 3, and 4 depending on the direction of the polarization so that the S- and P-polarized beams travel along the same optical path.

The S- and P-polarized beams travelling through the lighting unit 50 along the same path then enter the first optical path changing unit 65 having first and second reflective surfaces 65a and 65b after passing through the rotary polygon mirror 55 and the f-θ lens 60. The S- and P-polarized beams passing through the f-θ lens 60 are reflected from the first and second reflective surfaces 65a and 65b to travel along two different optical paths. For example, the first optical path changing unit 65 may have a triangular or wedged cross-section to form the first and second reflective surfaces 65a and 65b.

First and second polarization beam splitters 67 and 68 transmitting or reflecting incident beams depending on the direction of the polarization are located on the two optical paths along which the S- and P-polarized beams travel through the first optical path changing unit 65. Two beams divided by the first optical path changing unit 65 are transmitted and reflected through the first and second polarization beam splitters 67 and 68 and split into four beams that travel along first through fourth optical paths L1–L4. The four beams split at the polarization beam splitters 67 and 68 are scanned onto the first through fourth photoconductive drums 71, 72, 73, and 74, respectively. Here, it is possible that the first through fourth optical paths L1, L2, L3, and L4 from the first optical path changing unit 65 to the first through fourth photoconductive drums 71–74, respectively, have the same length.

To make lengths of the first through fourth optical paths L1, L2, L3, and L4 equal, the second and third optical path changing units 75 and 76 may be provided on the second and third optical paths L2, L3 between the first polarization beam splitter 67 and the third photoconductive drum 73 and between the second polarization beam splitter 68 and the second photoconductive drum 72, respectively. Furthermore, the fourth and fifth optical path changing units 77 and 78 may be provided on the first and fourth optical paths L1, L4 between the first polarization beam splitter 67 and the first photoconductive drum 71 and between the second polarization beam splitter 68 and the fourth photoconductive drum 74, respectively.

Transmission-type glass plates 79 and 80 are provided on the second and third optical paths L2, L3 between the first polarization beam splitter 67 and the second optical path changing unit 75 and between the second beam polarization beam splitter 68 and the third optical path changing unit 76, respectively. The S- and P-polarized beams travelling along the first and fourth optical paths L1 and L4 have been transmitted through the first and second polarization beam splitters 67 and 68, respectively. Taking this into consideration, the transmission-type glass plates 79 and 80 are provided to transmit the S- and P-polarized beams travelling along the second and third optical paths L2 and L3 so that they can have the same characteristics as the S- and P-polarized beams travelling along the first and fourth optical paths L1 and L4.

An operation of the color laser printer configured as above will now be described. The color laser printer according to the present invention is configured so that the S- and P-polarized beams emitted into different directions from the first and second light sources 1 and 2 and the third and fourth light sources 3 and 4 disposed in different directions travel along the same path through the polarization prism 5. This configuration reduces a cross-sectional area formed by entire beam paths when the S- and P-polarized beams emitted from the first through fourth light sources 1, 2, 3, and 4 travel along the same path through the polarization prism 5. In other words, this reduces the cross-sectional area of the entire beam paths compared with a conventional configuration where first through fourth light sources are arranged in parallel (i.e., sequentially in a longitudinal direction). This in turn reduces the cross-sectional area of an entire beam incident on the f-θ lens 60 after being reflected by the rotary polygon mirror 55. This invention allows the use of the f-θ lens 60 having a relatively small thickness.

As the thickness of the f-θ lens 60 decreases, it becomes easier to manufacture the f-θ lens 60 and offers a better performance of the color laser printer. In this way, due to the use of the f-θ lens 60 in manufacturing the color laser printer, the manufacturing cost is decreased while improving productivity.

The S- and P-polarized beams passing though the f-θ lens 60 are divided by the first optical path changing unit 65 into two beams traveling along the two optical paths. The divided beams are transmitted or reflected through the first and second polarization beam splitters 67 and 68 depending on the polarization direction and split into the four beams that travel along the first through fourth optical paths L1, L2, L3, and L4. Then, the second through fifth optical path changing units 75, 76, 77, and 78 are disposed in such a way as to make the lengths of the first through fourth optical paths L1, L2, L3, and L4 equal. This eventually makes equal the focal distances between the f-θ lens 60, through which the corresponding beam passes, and the photoconductive drums 71, 72, 73, and 74 for each color, on which the corresponding beam is focused. Thus, it eliminates a need of a separate correcting lens to make the focal distances equal.

Furthermore, the f-θ lens 60 that has a very small thickness provides accurate focusing onto the photoconductive drums 71, 72, 73, and 74, which eliminates a need of a separate focusing unit.

By operating the color laser printer as described above, images formed using the beams scanned onto the photoconductive drums 71, 72, 73, and 74 for each color are sequentially transferred to a transfer belt (medium) 83.

As described above, the color laser printer according to the present invention produces a color image using a single LSU, thereby significantly decreasing the manufacturing costs. Furthermore, the color laser printer uses one rotary polygon mirror and an f-θ lens, thereby reducing an assembling time and increasing the productivity. This is because it eliminates a need of electrical, mechanical, and optical adjustments which were required in a conventional color laser printer with four rotary polygon mirrors used to reduce a fine jitter and a periodic oscillation, respectively occurring from the spindle motors rotating the rotary polygon mirrors. Additionally, minimized jitter characteristics provide high speed printing and improve an image quality.

Furthermore, the present invention is constructed such that a plurality of light sources emitting beams of one polarization are arranged separately, and the beams emitted from the light sources are combined by a polarization prism to enter an f-θ lens, thereby requiring the f-θ lens of a reduced thickness. Thus, this makes it easier to manufacture f-θ lenses with an excellent performance.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A color laser printer producing a color image using a single laser scanning unit, the color laser printer comprising:
    a lighting unit including first and second laser diodes emitting first beams having a first polarization, third and fourth laser diodes disposed in a different direction from the first and second laser diodes to emit second beams having a second polarization, and a polarization prism transmitting or reflecting the first and second beams depending on a direction of polarization to transmit the first and second beams along the same path;
    a rotary polygon mirror that reflects the first and second beams transmitted along the same path from the lighting unit;
    an f-θ lens that focuses the first and second beams reflected by the rotary polygon mirror;
    first and second polarization beam splitters, each of which transmits or reflects the first and second beams passing through the f-θ lens depending on the direction of the polarization; and
    first through fourth photoconductive units on which the first and second beams reflected and transmitted through the first and second polarization beam splitters are incident,
    wherein lengths of optical paths between the f-θ lens and each of the first through fourth photoconductive units are equal to one another.

2. The color laser printer of claim 1, wherein the first and second polarization beam splitters are disposed to form a V-shape.

3. The color laser printer of claim 2, further comprising an optical path changing unit disposed on the paths along which the first or second beams transmitted through the first and second polarization beam splitters respectively travel.

4. The color laser printer of claim 1, further comprising an optical path changing unit disposed on the optical paths along which the first or second beams transmitted through the first and second polarization beam splitters respectively travel.

5. A color laser printer producing a color image using a single laser scanning unit, the color laser printer comprising:
    a lighting unit including first and second laser diodes for emitting beams of one polarization, third and fourth laser diodes disposed in a different direction from the first and second laser diodes to emit second beams having a second polarization, and a polarization prism transmitting or reflecting the first and second beams depending on a direction of polarization to output the first and second beams along a common path;
    a rotary polygon mirror that reflects the first and second beams outputted along the common path from the lighting unit;
    an f-θ lens that focuses the first and second beams reflected by the rotary polygon mirror;
    a first optical path changing unit that divides the common path of the first and second beams passing through the f-θ lens into two different paths;
    first and second polarization beam splitters, each of which transmits or reflects the first and second beams divided by the first optical path changing unit depending on the direction of the polarization; and
    first through fourth photoconductive units on which the first and second beams reflected and transmitted through the first and second polarization beam splitters are incident,
    wherein lengths of optical paths formed between the f-θ lens and respective ones of the first through fourth photoconductive units are equal to one another.

6. The color laser printer of claim 5, wherein the first optical path changing unit has a triangular or wedged cross-section.

7. The color laser printer of claim 6, further comprising:
    second and third optical path changing units disposed on the optical paths along which the first or second beams reflected through the first and second polarization beam splitters respectively travel.

8. The color laser printer of claim 7, further comprising:
    transmission-type glass plates disposed between the first polarization beam splitter and the second optical path changing unit and between the second polarization beam splitter and the third optical path changing unit, respectively.

9. The color laser printer of claim 6, further comprising:
    fourth and fifth optical path changing units disposed on the optical paths along which the first or second beams transmitted through the first and second polarization beam splitters respectively travel.

10. The color laser printer of claim 9, further comprising:
    collimating lenses respectively disposed between the polarization prism and the first, second, third, and fourth laser diodes.

11. The color laser printer of claim 10, further comprising:
    a cylindrical lens disposed between the polarization prism and the rotary polygon mirror.

12. The color laser printer of claim 6, further comprising:
    transmission-type glass plates disposed between the first polarization beam splitter and the second optical path changing unit and between the second polarization beam splitter and the third optical path changing unit, respectively.

13. The color laser printer of claim 5, further comprising:
    transmission-type glass plates disposed between the first polarization beam splitter and the second optical path changing unit and between the second polarization beam splitter and the third optical path changing unit, respectively.

14. The color laser printer of claim 13, further comprising:
    fourth and fifth optical path changing units disposed in paths along which the first or second beams transmitted through the first and second polarization beam splitters respectively travel.

15. A color laser printer producing a color image using a single laser scanning unit, the color laser printer comprising:
    a lighting unit which generates a first beam having a first polarization, generates a second beam having a second polarization, and outputting the first and second beams along a common optical axis;
    a first polarization beam splitter which transmits one of the first and second beams to generate a first path beam along a first optical path and reflects the other one of the first and second beams to generate a second path beam along a second optical path according to a direction of the first and second polarizations;

a second polarization beam splitter which transmits the one of the first and second beams to generate a third path beam along a third optical path and reflects the other one of the first and second beams to generate a fourth path beam along a fourth optical path according to the direction of the first and second polarizations; and a plurality of photoconductive units on which one of the first, second, third, and fourth path beams reflected or transmitted by the first and second polarization beam splitters along the first, second, third, and fourth optical paths, respectively, is incident.

16. The color laser printer of claim 15, further comprising:
a rotary polygon mirror which reflects the first and second beams transmitted along the common optical axis of the lighting unit toward the first and second polarization beam splitters.

17. The color laser printer of claim 15, further comprising:
an f-θ lens disposed between the rotary polygon mirror and the first and second polarization beam splitters to focus the first and second beams reflected by the rotary polygon mirror on the first and second polarization beam splitters.

18. The color laser printer of claim 17, further comprising:
an optical path changing unit that divides the common optical path of the first and second beams passing through the f-θ lens into two different optical paths along which the first and second beams are transmitted to the first and second polarization beam splitters.

19. The color laser printer of claim 18, wherein the optical path changing unit comprises:
a first surface reflecting the first and second beams along one of the two different optical paths; and
a second surface reflecting the first and second beams along the other one of the two different optical paths.

20. The color laser printer of claim 19, wherein the first and second surfaces form an angle with respect to the common optical axis.

21. The color laser printer of claim 19, wherein the first and second surfaces form a first angle and a second angle with respect to the common optical axis.

22. The color laser printer of claim 19, wherein the first and second angle are the same.

23. The color laser printer of claim 19, wherein the common optical axis is perpendicular to the two different optical paths.

24. The color laser printer of claim 18, wherein the two different optical paths have the same length.

25. The color laser printer of claim 24, wherein the first, second, third, and fourth optical paths formed between each of the first and second polarization beam splitters and a corresponding one of the photoconductive units have the same length.

26. The color laser printer of claim 15, wherein the first, second, third, and fourth optical paths formed between each of the first and second polarization beam splitters and a corresponding one of the photoconductive units have the same length.

27. The color laser printer of claim 15, wherein the lighting unit comprises:
first and second laser diodes each emitting the first beam; and
third and fourth laser diodes each emitting the second beam.

28. The color laser printer of claim 27, wherein the lighting unit comprises:
a polarization prism transmitting or reflecting the first and second beams depending on a direction of polarization to transmit the first and second beams along the common optical axis.

29. The color laser printer of claim 28, wherein the polarization prism comprises first and second sides, and the first and second laser diodes are disposed on the first side of the polarization prism while the third and fourth laser diodes are disposed on the second side of the polarization prism.

30. The color laser printer of claim 28, wherein the first and second laser diodes are disposed to emit the first beam perpendicular to the first surface of the polarization prism, and the third and fourth laser diodes are disposed to emit the beam, respectively, perpendicular to the second surface of the polarization prism.

31. The color laser printer of claim 30, wherein the first beam comprises a first sub-beam emitted from the first laser diode and a second sub-beam emitted from the second laser diode, and the second beam comprises a third sub-beam emitted from the third laser diode and a fourth sub-beam emitted from the fourth laser diode.

32. The color laser printer of claim 31, wherein the first sub-beam and the second sub-beam have the same length between the polarization prism and the first and the second laser diodes, and the third sub-beam and the fourth sub-beam have the same length between the polarization prism and the third and the fourth laser diodes.

33. The color laser printer of claim 31, wherein the polarization prism reflects the first and second sub-beams along the common optical axis and transmits the third and fourth sub-beams along the common optical axis.

34. he color laser printer of claim 28, wherein the first and second beams are perpendicular to each other.

35. The color laser printer of claim 28, wherein one of the first and second beams is parallel to the common optical axis.

36. The color laser printer of claim 28, wherein the first and second laser diodes are disposed perpendicular to the third and fourth laser diodes with respect to the polarization prism.

37. The color laser printer of claim 15, wherein the number of the photoconductive units are four, and two of the photoconductive units are disposed on the first and third optical paths while the other two photoconductive units are disposed on the second and fourth optical paths.

38. he color laser printer of claim 37, wherein the other two of the photoconductive units are disposed opposite each other with respect to the first and second polarization beam splitters.

39. The color laser printer of claim 37, further comprising:
first and second optical path changing units disposed between the first polarization beam splitter and one of the two photoconductive units and between the second polarization beam splitter and the other one of the two photoconductive units, respectively, to direct the first path beam and the second path beam toward the two photoconductive units, respectively.

40. The color laser printer of claim 39, wherein the first and second optical path changing units form an angle with respect to the common optical axis.

41. The color laser printer of claim 39, wherein the first and second optical path changing units are disposed opposite each other with respect to the first and second optical path changing units.

42. The color laser printer of claim 37, further comprising:
a rotary polygon mirror which reflects the first and second beams transmitted along the common optical axis of the lighting unit toward the first and second polarization beam splitters.

43. The color laser printer of claim 42, further comprising:
an f-θ lens disposed between the rotary polygon mirror and the first and second polarization beam splitters to focus the first and second beams reflected by the rotary polygon mirror on the first and second polarization beam splitters.

44. The color laser printer of claim 15, wherein the first and second polarization beam splitters form an angle with respect to the common optical axis.

45. A color laser printer producing a color image using a single laser scanning unit, the color laser printer comprising:
a plurality of light sources separately arranged to emit beams of first and second polarizations;
a polarization prism combining the beams emitted from the light sources to output the beams along a common optical path; and
an f-θ lens focusing the beams outputted from the polarization prism;
wherein a thickness of the f-θ lens is reduced to improve a performance of the f-θ lens and further comprising first and second beam splitters directing the beams along different optical paths according to the polarization.

46. The color laser printer of claim 45, further comprising:
a mirror rotating to direct the beams from the polarization prism to the f-θ lens.

47. The color laser printer of claim 45, further comprising:
a photoconductive medium having a plurality of surfaces corresponding to the optical paths.

48. The color laser printer of claim 47, wherein the photoconductive medium comprises:
a plurality of photoconductive drums disposed on corresponding ones of the optical paths and having corresponding ones of the surfaces to receive corresponding beams.

49. A method in a color laser printer producing a color image using a single laser scanning unit, the method comprising:
generating a first beam having a first polarization, a second beam having a second polarization to output the first and second beams along a common optical axis;
transmitting, via a first polarization beam splitter, one of the first and second beams to generate a first path beam along a first optical path;
reflecting, via the first polarization beam splitter, the other one of the first and second beams to generate a second path beam along a second optical path according to a direction of the first and second polarizations;
transmitting, via a second polarization beam splitter, the one of the first and second beams to generate a third path beam along a third optical path;
reflecting, via the second polarization beam splitter, the other one of the first and second beams to generate a fourth path beam along a fourth optical path according to the direction of the first and second polarizations; and
causing a plurality of photoconductive units to be disposed on the first, second, third, and fourth optical paths along which the first, second, third, and fourth path beams reflected or transmitted by the first and second polarization beam splitters are incident to corresponding ones of the photoconductive units.

* * * * *

UNITED STATES PATENT AND TRADEMARK OFFICE
CERTIFICATE OF CORRECTION

PATENT NO. : 7,079,171 B2 Page 1 of 1
APPLICATION NO. : 10/423988
DATED : July 18, 2006
INVENTOR(S) : Bu-hyun Sung et al.

It is certified that error appears in the above-identified patent and that said Letters Patent is hereby corrected as shown below:

Column 12, line 36, change "he" to -- The --

Column 12, line 50 change "he" to -- The --

Signed and Sealed this

Fifth Day of December, 2006

JON W. DUDAS
*Director of the United States Patent and Trademark Office*